United States Patent [19]
Narendranath et al.

[11] Patent Number: 5,953,499
[45] Date of Patent: Sep. 14, 1999

[54] COLOR PRINTING HUE ROTATION SYSTEM

[75] Inventors: Nagesh H. Narendranath; Fritz F. Ebner, both of Rochester, N.Y.

[73] Assignee: Xerox Corporation, Stamford, Conn.

[21] Appl. No.: 08/884,238

[22] Filed: Jun. 27, 1997

[51] Int. Cl.⁶ .................................................. G06F 15/00
[52] U.S. Cl. ......................... 395/109; 358/518; 358/520
[58] Field of Search ..................................... 395/109, 101; 358/518, 519, 520, 504, 406, 522, 521, 523, 524, 500, 501; 382/167, 162, 274, 275; 345/153, 431, 154

[56] References Cited

U.S. PATENT DOCUMENTS

| | | | |
|---|---|---|---|
| 4,500,919 | 2/1985 | Schreiber | 358/78 |
| 4,941,038 | 7/1990 | Walowit | 358/80 |
| 4,963,925 | 10/1990 | Miyazaki | 355/77 |
| 5,172,224 | 12/1992 | Collette et al. | 358/406 |
| 5,289,295 | 2/1994 | Yumiba et al. | 358/518 |
| 5,483,360 | 1/1996 | Rolleston et al. | 358/518 |
| 5,528,386 | 6/1996 | Rolleston et al. | 358/522 |
| 5,594,557 | 1/1997 | Rolleston et al. | 358/518 |
| 5,734,802 | 3/1998 | Maltz et al. | 395/109 |
| 5,751,845 | 5/1998 | Dorff et al. | 382/162 |
| 5,812,286 | 9/1998 | Lin | 358/519 |

FOREIGN PATENT DOCUMENTS 0-443-851-A1  8/1991  European Pat. Off. .

*Primary Examiner*—Dov Popovici

[57] ABSTRACT

The present invention is a system and method for improved rendering of color images, such as by more accurately and/or desirably matching printed outputs to CRT monitor color graphics. A hue rotation system is employed to improve color rendering.

7 Claims, 3 Drawing Sheets

COLOR PRINTING HUE ROTATION SYSTEM

The present invention relates to a digitized rendering system as may be used in color printing systems (such as in electrophotographic and ink-jet printers and copiers), and more particularly, to an system and method for improving color output image quality according to a system employing hue rotation to more accurately and/or desirably print images such as those that may originally displayed on a color CRT monitor.

In the operation of a color printer, it is highly desirable that an imaging system correct or otherwise improve or enhance color gamut of an output device. It is common to have certain hues that may appear on a CRT monitor to be incorrectly reproduced with a color printer. For example, particulate blue hues may not be faithfully reproduced by the common lookup tables ("LUTs") used to perform color reproduction in printing. Various systems employed, such as multivariate linear regression and others, are not always successful in correcting certain undesirable hue shifts with without creating problems in other hues that should not be altered.

While the process of digital electrostatographic printing will be described herein and has been used to test and render the system and method of the present invention, other printing systems may likewise be employed with then present invention. In electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. In many instances, three, four or more colors of toner particles may be used. Typically, cyan, magenta, yellow and black are used in four color systems; other colors may be used in addition to or in place of these colors in order to expand, modify or improve the available color gamut that one or more toners in combination can produce. When appropriate, toner particles are mixed with carrier granules and the toner particles are charged triboelectrically to the correct polarity. As the developer mix is brought into contact with the electrostatic latent image, the toner particles adhere thereto. Non-xerographic systems (such as ink-jet) may be more or less successful in printing high quality images of varying types in and may involve capabilities and/or efficiencies like (or at times unlike) those found in xerographic systems.

Various systems have been employed to include those set forth in the following disclosures which may be relevant to various aspects of the hue rotation system and method of the present invention.

U.S. Pat. No. 4,500,919

Patentee: Schreiber

Issued: Feb. 19, 1985

U.S. Pat. No. 4,941,038

Patentee: Walowit

Issued: Jul. 10, 1990

U.S. Pat. No. 5,483,360

Patentee: Rolleston et al.

Issued: Jan. 9, 1996

U.S. Pat. No. 5,528,386

Patentee: Rolleston et al.

Issued: Jun. 18, 1996

U.S. Pat. No. 5,594,557

Patentee: Rolleston et al.

Issued Jan. 14, 1997

U.S. Pat. No. 4,500,919 discloses a system for reproducing a color original in a medium using a selected multiplicity of reproduction colorants, comprising; a scanner for producing from said color original a train of appearance signals dependent on at least three color values of said original; aesthetic correction circuitry for introducing aesthetically desired alteration into said appearance signals to produce modified appearance signals; and colorant selection mechanism for receiving said modified appearance signals and for selecting corresponding reproduction signals representing values of said reproduction colorants to produce in said medium a color match of said modified appearance signals.

U.S. Pat. No. 4,941,038 discloses a method for processing color image data converts input RGB color data to output CMY color data. An input device is calibrated to a intermediate color space, and an output device is calibrated to the intermediate color space. The input RGB color data is collected from the input device and is converted to intermediate color space data. The intermediate color space data is converted to the output CMY color data and is outputted to the output device. During the conversion process, the image data is processed to compensate for gamut mismatch.

U.S. Pat. No. 5,483,360 discloses a color printer, responsive to printer signals to deposit printer colorants on a medium in accordance with printer signals received is calibrated by operating the color printer with printer signals selected to cause the printer to print color samples on the medium; measuring the color samples to determine a first colorimetric response of the printer to the printer signals using the first measured calorimetric response to generate a first mapping of calorimetric values to printer signals; using the first measured calorimetric response or a subsequent measured calorimetric response to generate at least one additional mapping of calorimetric values to printer signals; storing the first and additional mappings in a color conversion memory producing printer signals as a function of the first and additional mappings stored in the color conversion memory to convert color definitions from a first color space to the printer signals suitable for producing a corresponding response at the color printer.

U.S. Pat. No. 5,528,386 discloses a printer which produces images as a function of the combination of cyan (C), magenta (M), yellow (Y) and black (K) colorants on an output color print, responsive to device independent calorimetric description of an image, there is provided a method of calibrating the response of the printer to an image described in terms of colorimetric values, including the steps of first, gray balancing or linearizing colorant signals; secondly, adding black to an ideal device dependent description of a color image in accordance with a predetermined black addition process, and thirdly, providing a color correction transformation process, where the color correction transformation is accomplished via a method of interpolating printer responses from a look-up table indexing calorimetric descriptions of measured real responses, which take into account subsequent black addition and signal linearization.

U.S. Pat. No. 5,594,557 discloses a color printer calibration method for improving printer accuracy in regions of local non-linearity including the steps of: a) starting with filled rectangular array of color mappings $A_0$ mapping printer signals to device independent color space signals; b) empirically deriving a set of color mappings $P_i$ in an area of interest; c) using a set of planes defined by the color mappings of $A_0$ and each point defined by $P_i$ is located at the intersection of three planes, the intersection points of this expanded number of planes defining a set of points $P_{i(expanded)}$ that define a full rectangular array $A_1$ of mappings including mappings $A_0$, mappings $P_i$ and mappings $P_{i(expanded)}$; d) storing the mappings $A_1$ for use in the creation of a new color space transformation LUT for use with the printer.

In accordance with one aspect of the present invention, there is provided a method for printing a color corrected image from a monitor with a printer. The method includes providing a set of uniformly spaced monitor color data; transforming the uniformly spaced monitor data into a set of hue saturation value color space data; and applying the hue saturation value color space data to a rotated lookup table for selectively rotating hue angles of that data so as to improve the colorization uniformly spaced monitor color data; and rendering the rotated hue color corrected image with a print engine.

Other features of the present invention will become apparent as the following description proceeds and upon reference to the drawings, in which.

Figure 1:
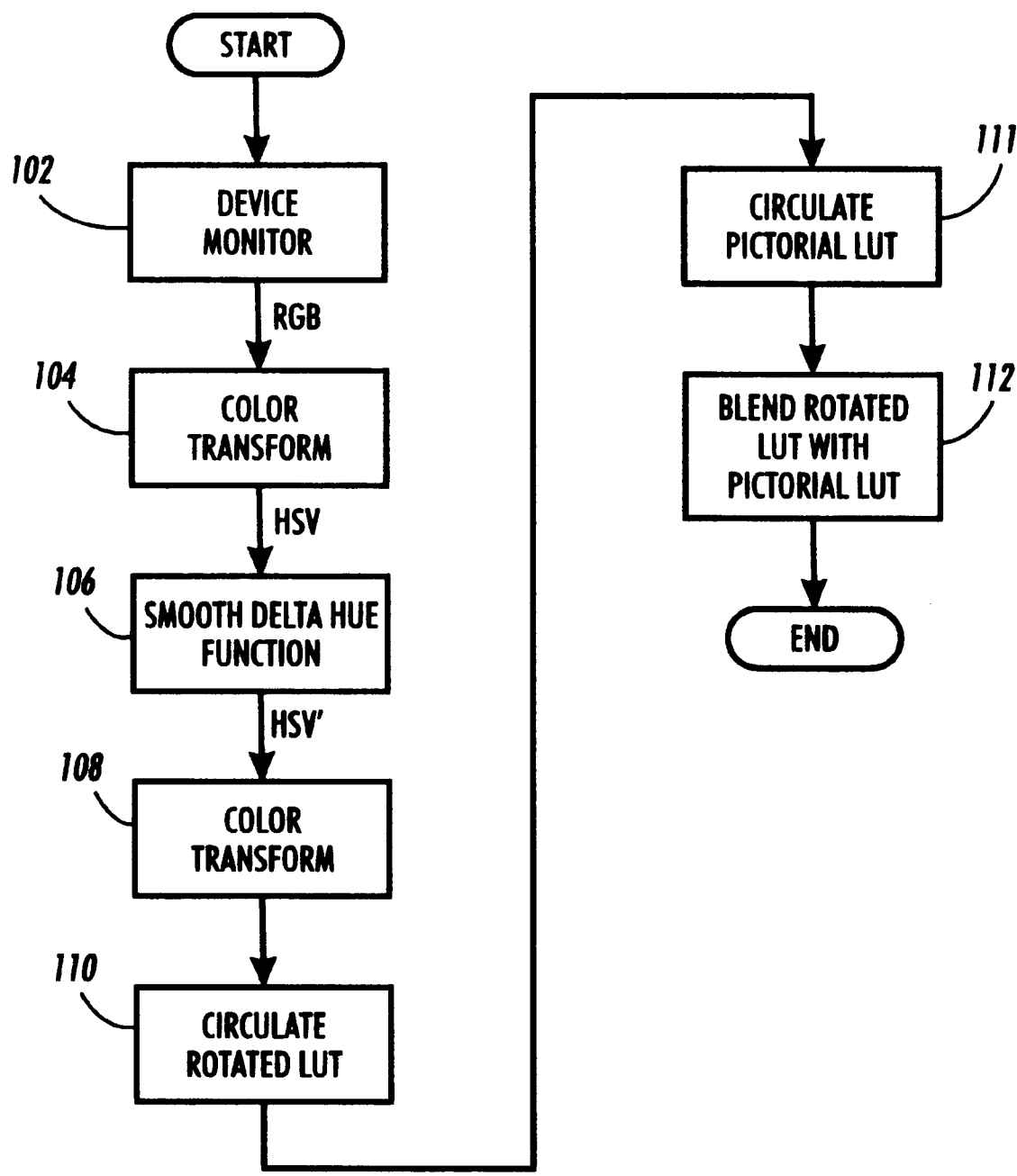
FIG. 1 is a flowchart showing the exemplary system of the present invention.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

A number of terms will be used herein, including the following terms and words: An "image" is a pattern of physical light. An image may include characters, words, and text as well as other features such as graphics. An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." A pixel is the smallest segment of an image whose value is indicated in an item of data defining the image. In an array defining an image in which each item of data provides a value, each value or signal indicating the color of a location may be called a "pixel value" or "signal". Each pixel value is a set of color space coordinates in a "color coordinate form" of an image, the color coordinate form being a two-dimensional array defining an image.

An "image input terminal" (IIT) is a device that can receive an image and provide an item of data defining a version of the image. A "scanner" is an image input device that receives an image by a scanning operation, such as by scanning a document.

An "image output terminal" (IOT) is a device that can receive an item of data defining an image and provide the image as output. A "display" is an image output device that provides the output image in human viewable form. The visible pattern presented by a display is a "displayed image" or simply "image."

"Gamut" describes the entire range of perceived color that may be obtained under stated conditions. For example, the gamut of a particular printer is defined by the features of the printer and the inks or marking materials used therein. The term "hue" is used to describe the quality of color as perceived visually, usually described with respect to one or a combination of color names: white, gray, black, red, yellow, green blue, etc. "Color separations" are used by printers to reproduce color artwork or images. Page description languages, i.e., PostScript™, treat most images as sampled images where the separations are the representation of the image. A "color space" is a method for specifying a color. The CIE system is an international standard for color specification that is independent of the characteristics of any particular output device. A "device color space" is a method for directly specifying colors that an output device is to produce. Device color spaces enable a page description language to specify color values that are directly related to their representation on an output device. These color spaces include RGB (red-green-blue), HSB (hue saturation-brightness) and CMYK (cyan-magenta-yellow-black).

Figure 3:
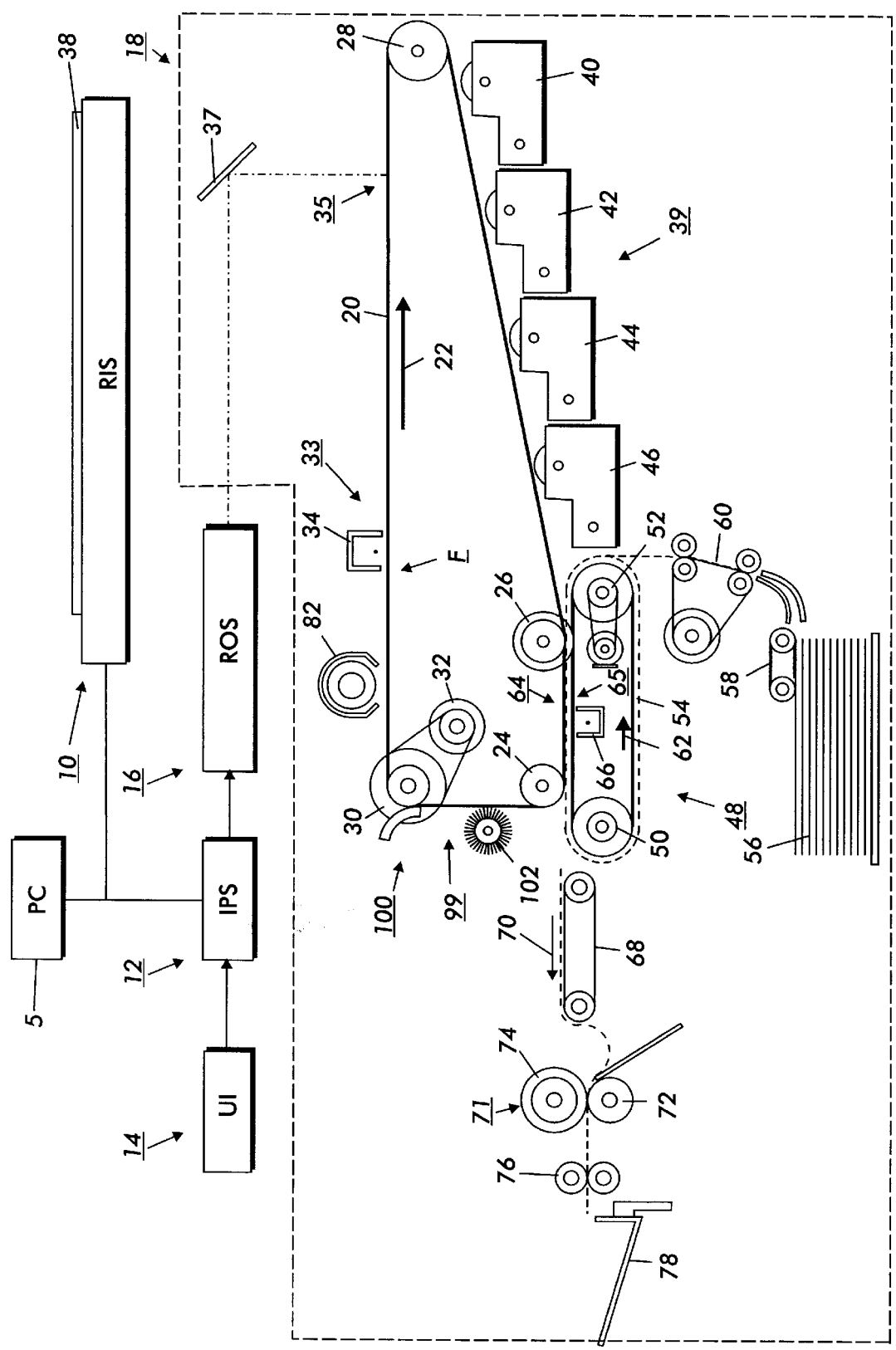
FIG. 3 is a schematic elevational view showing an exemplary color xerographic printing/copying machine and networked PC incorporating features of the present invention therein.

For a general understanding of the features of the present invention, reference is now made to the drawings. FIG. 3 is a schematic elevational view showing an exemplary electrophotographic printing/copying machine (such as a Xerox 5775) and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown), as well as carry out the image rendering selections in accordance with the present invention as described in association with FIGS. 1 through 3 below.

As further shown in FIG. 3, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen or CRT monitor (not shown in FIG. 3). IPS 12 may include the processor(s), controller(s), memory, LUTs and other capabilities (not shown in FIG. 3) required to perform the hue rotation system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, or even asymmetrical resolutions, such as 300×1200 dpi.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a print sheet in superimposed registration with one another to form a multicolored image on the print sheet. This multicolored image is then fused to the sheet forming a color print.

With continued reference to FIG. 3, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown in FIG. 3) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 3) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 3) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the system of the present invention, such as in the case of versions of the Xerox DocuPrint C55 color printer in which certain aspects of the system as outlined below have been tested.

Figure 2:
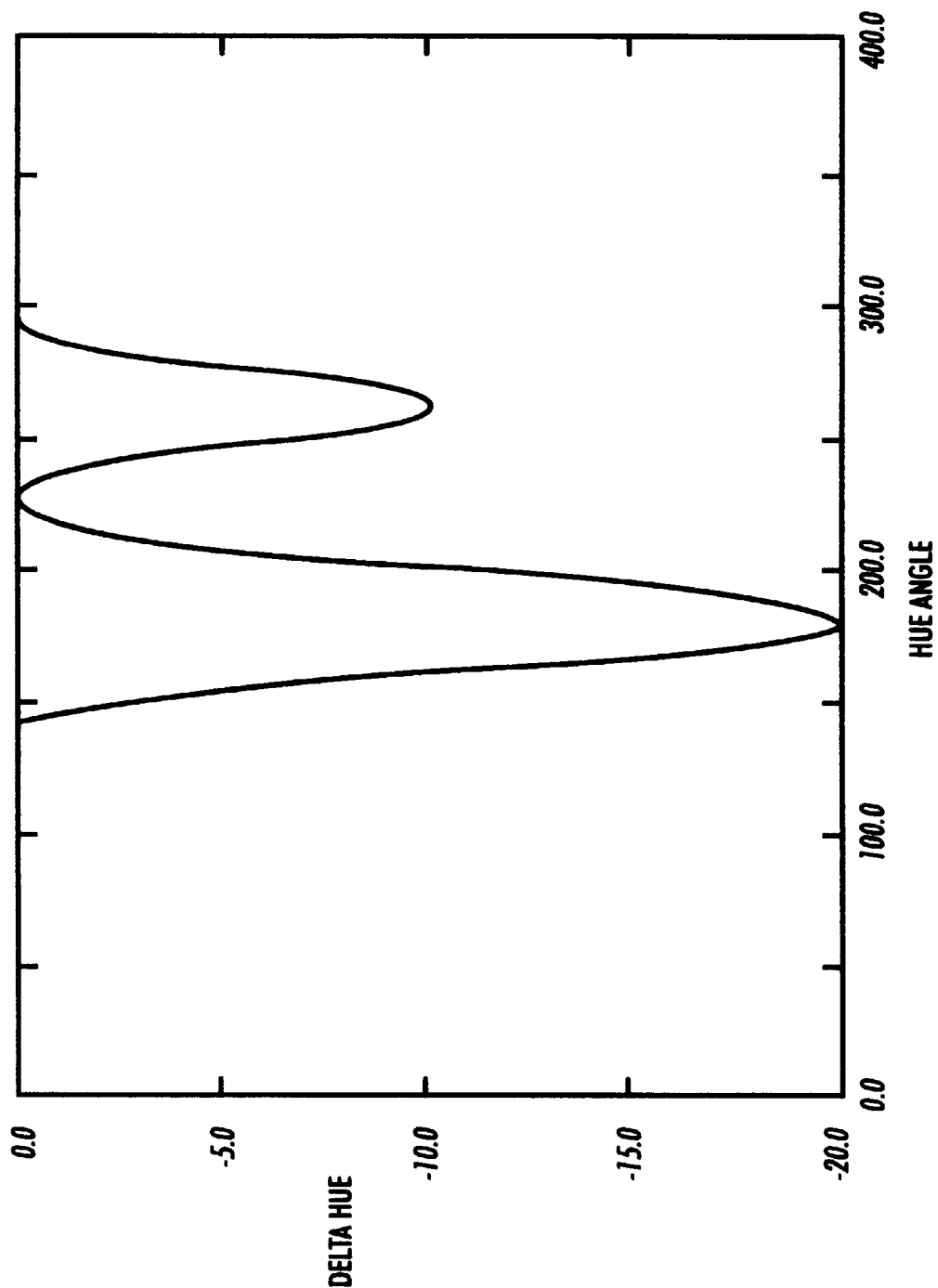
FIG. 2 is a two-dimensional representation of a hue rotated color space produced to provide color correction using hue rotation in accordance with the present invention.

In conjunction with FIGS. 1 and 2, the present invention will be generally be described in terms of its application to and execution by a printer (and its ESS, networked PC and related systems) such as described above in association with FIG. 3. The descriptions that follow in association with Figures describe aspects of the present invention as may be implemented in a multicolor print engine.

Printers typically render outputs in four colors (such as the C, M, Y, K printer shown in FIG. 3). In particular, the usual CMYK toner colors are uniquely selected due to their ability to produce a broad gamut of vibrant color combinations. Many such color printers operate by the addition of multiple layers of these inks or toner colorants in layers or halftone dots to a page according to (often) non-linear responses. Thus, while a printer receives information in a first color space which has values defined device independent color values, it must convert that information to print in a second color space which is dependent of device characteristics.

FIG. 1 is a flow chart of the system of the present invention. The present invention provides a method of generating and a system for using a rotated hue lookup table ("LUT") for rendering color images with a printer. The technique can be used for a variety of purposes, such as for altering hues for business graphics (or for that matter, pictorials/bitmaps and text) to be rendered by a printing device so that those hues are corrected or adjust to provide more pleasing or calorimetrically accurate printed images. For example, the method and system of the present invention may permit a printed output to more accurately match the hues appearing on a users interface monitor or screen. By employing a LUT that allows hues to be "rotated", the desired hue output alteration (such as a screen or monitor match) of match is achieved. For example, more accurate color rendering (matching) of the Microsoft® Office Suite default colors has be achieved by this method and system which uses a blended LUT approach in a muti-pass color printer (a Xerox DocuPrint C55 color laser printer). The present invention may be useful with a variety of printer and copier applications, to provide a user with rendering options or more accurately reproduced (printed) color images.

In particular, the problem of matching a printed output to colors on a monitor or screen is a well known but not well mastered challenge in color rendering. Different mapping techniques, such as the hue shifting or "warping of the color space" techniques described in U.S. patent application Ser. No. 08/647,511, also assigned to Xerox and incorporated herein by reference, have been designed in order to generate the printed colors to look like the ones on the monitor. The present invention provides a novel method and system to match the required or desired rendered output colors more closely to the monitor using a blended LUT approach. For example, blue is one of the colors that frequently is not accurately reproduced (such as when compared to the blue displayed on a monitor screen).

Color rendering is typically accomplished as the result of the processing of color separation data, as for example in IPS subsystem 12 in FIG. 1. Referring to pages 25–66 and in particular Plate III of "Principles of Color Technology, 2nd Ed." by F. W. Billmeyer et al., John Wiley & Sons, New York (1981), hereby incorporated by reference for its teachings relevant to color space, there is displayed a hue-saturation-brightness (HSB) color space representation as one might find in the Munsell System. In particular, the hue value in such a color space specifies a point on a color circle or band, but not its intensity or brightness. The possible hue values in a particular device color space are typically equally spaced within the boundaries of the device color gamut. The primaries red, green and blue are equally spaced about the color circle at approximately 0, 120 and 240 degrees. The color blue is characterized with a hue angle of approximately 240°.

FIG. 1 shows an exemplary color path for the method of creating a hue rotated LUT in accordance with Hue Rotation system 100 of the present invention. According to block 102, a set of uniformly spaced "Device Monitor" color data is provided in the form of RGB Data. This RGB data is then transformed to the Hue Saturation Value ("HSV") space by "Color Transform" block 104. Next, a hue rotation (delta) function is generated such as graphically depicted in FIG. 2, such that hue angles are selectively rotated to create more pleasing and/or accurate color renderings. This smoothing function is then applied to the HSV data according to the "Smooth Deltahue Function" block 106, thus transforming the sampled HSV data into the rotated HSV' data. Thereafter, the sampled HSV' data is converted back to RGB' data according to "Color Transform" block 108. Thereafter, a Rotated LUT is calculated based on the input RGB and the rotated RGB', such that the resultant LUT transforms colors based on a smooth function. According to block 111, a "Pictorial LUT" is created The hue rotated LUT is then blended with the Pictorial LUT according to Block 112 to obtain the final rendering device (printer) LUT. (The blending of these two LUTs can be performed according to one or more blending techniques, such as a weighted combination LUT blending technique disclosed is U.S. Pat. No. 5,483,360 assigned to Xerox and incorporated fully herein by reference.)

Tests were performed on a Xerox DocuPrint C55 color laser printer to determine if more desirable/visually pleasing renderings could be produced using the system of the present invention. In one test, several of the Microsoft® Office Suite colors appearing on a PC screen, when printed without the system of the present invention produced hues that are not particularly pleasing to the eye. For example, the process blue color when rendered appears quite purple when printed without the system of the present invention. In accordance with the hue rotation system of the present invention, this same blue color was rendered with a hue rotated LUT having a hue rotation of 12 degree towards cyan to map the monitor blue color on the printer; the result was a rendered output that faithfully resembled the more pleasing hue of the Microsoft® Office Suite screenj/monitor blue. Again, FIG. 2 graphically shows a preferred embodiment of the hue rotation function which provides desirable and/or more accurate rendering of rotated hues.)

The method and system of the present invention can also be applied to other colors using different smoothing functions in their color range to achieve the required hue match. Other test prints showed that other colors (such as a "cyanish" green as it appears on monitor) could be more faithfully rendered using the rotated LUT method and system of the present invention. While the advantages and desirability of the use of the rotated/blended LUTS of the present invention may be most obvious in rendering solid area colors of business graphic images, the advantages of the method and system of the present invention is also applicable to pictorial and text objects on a document as well.

While the present invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for printing a color corrected image from a monitor with a printer, comprising:

providing a set of uniformly spaced monitor color data;

transforming the uniformly spaced monitor data into a set of hue saturation value color space data; and applying the hue saturation value color space data to a rotated lookup table for selectively rotating hue angles of that data so as to improve the colorization uniformly spaced monitor color data; and rendering the rotated hue color corrected image with a print engine.

2. The method of claim 1, wherein the uniformly spaced monitor color data is provided in the form of RGB data.

3. The method of claim 2, wherein the RGB data is then transformed to the hue saturation value color space data.

4. The method of claim 1, wherein a smoothing function is then applied to the hue saturation value color space data.

5. The method of claim 1, further comprising the steps of:

creating a pictorial lookup table; and blending the pictorial table with the rotated lookup table to produce a blended lookup table.

6. The method of claim 1, wherein a blue hue of the rendered output approximates a blue hue displayed on the monitor.

7. The method of claim 1, wherein a green hue of the rendered output approximates a green hue displayed on the monitor.

* * * * *